United States Patent
Manepalli et al.

(10) Patent No.: US 10,313,941 B2
(45) Date of Patent: Jun. 4, 2019

(54) APPARATUS, SYSTEMS AND METHODS FOR IMPROVED MOBILITY BETWEEN NETWORKS

(71) Applicant: APPLE INC., Cupertino, CA (US)

(72) Inventors: Venkateswara Rao Manepalli, San Jose, CA (US); Lakshmi N. Kavuri, Cupertino, CA (US); Madhusudan Chaudhary, Campbell, CA (US); Srinivasan Nimmala, San Jose, CA (US); Jianxiong Shi, Dublin, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/177,802

(22) Filed: Jun. 9, 2016

(65) Prior Publication Data

US 2017/0359761 A1 Dec. 14, 2017

(51) Int. Cl.
*H04W 36/00* (2009.01)
*H04W 36/14* (2009.01)
*H04W 76/19* (2018.01)
*H04W 76/38* (2018.01)
*H04W 36/24* (2009.01)
*H04W 84/12* (2009.01)
*H04W 4/80* (2018.01)

(52) U.S. Cl.
CPC ........... *H04W 36/14* (2013.01); *H04W 36/24* (2013.01); *H04W 76/19* (2018.02); *H04W 76/38* (2018.02); *H04W 4/80* (2018.02); *H04W 84/12* (2013.01)

(58) Field of Classification Search
CPC ..... H04W 48/16; H04W 60/00; H04W 48/18; H04W 36/30; H04W 36/32; H04W 36/18; H04W 36/04; H04W 88/06; H04W 80/04; H04W 84/12; H04L 2012/5607
See application file for complete search history.

(56) References Cited

U.S. PATENT DOCUMENTS

| | | | |
|---|---|---|---|
| 6,272,140 B1* | 8/2001 | LaRowe, Jr. ..... | H04W 72/0453 370/403 |
| 7,184,782 B1* | 2/2007 | Ljungstrom ........... | H04Q 3/005 379/219 |
| 7,346,348 B1* | 3/2008 | Gazzard .................. | H04W 8/06 370/315 |
| 2004/0203596 A1* | 10/2004 | Sreemanthula ......... | H04L 29/06 455/411 |
| 2008/0089272 A1* | 4/2008 | Ahokangas ........... | H04W 48/18 370/328 |
| 2009/0258672 A1* | 10/2009 | Camp, Jr. ............. | H04W 48/18 455/553.1 |
| 2011/0207473 A1* | 8/2011 | Swaminathan ....... | H04W 48/16 455/456.1 |

(Continued)

*Primary Examiner* — Stephen M D Agosta
(74) *Attorney, Agent, or Firm* — Fay Kaplun & Marcin, LLP (57) ABSTRACT

Described herein are apparatus, systems and methods for improved mobility between wireless networks. A method may comprise, at a user equipment ("UE") in communication with a cellular network activating a detach timer for the cellular network, detecting a short-range network, communicating with the short-range network, storing registration and bearer context data related to the cellular network, interrupting communication with the cellular network, and prior to the expiration of the detach timer, reconnecting to the cellular network via a service request without using an attach procedure.

18 Claims, 4 Drawing Sheets

(56) References Cited

U.S. PATENT DOCUMENTS

| | | | |
|---|---|---|---|
| 2012/0115454 A1* | 5/2012 | Liao | H04W 60/02 |
| | | | 455/418 |
| 2012/0157093 A1* | 6/2012 | Zhu | H04W 60/00 |
| | | | 455/433 |
| 2012/0302241 A1* | 11/2012 | Klingenbrunn | H04W 48/16 |
| | | | 455/436 |
| 2013/0012204 A1* | 1/2013 | Kim | H04W 60/06 |
| | | | 455/435.1 |
| 2013/0017829 A1* | 1/2013 | Kim | H04W 60/06 |
| | | | 455/435.1 |
| 2013/0172023 A1* | 7/2013 | Chan | H04W 4/14 |
| | | | 455/466 |
| 2013/0223312 A1* | 8/2013 | Ai | H04W 80/04 |
| | | | 370/311 |
| 2014/0044030 A1* | 2/2014 | Ramachandran | H04W 52/0235 |
| | | | 370/311 |
| 2014/0308986 A1* | 10/2014 | Yang | H04W 88/06 |
| | | | 455/552.1 |
| 2015/0181476 A1* | 6/2015 | Yang | H04W 36/00 |
| | | | 370/331 |
| 2015/0237536 A1* | 8/2015 | Shu | H04W 36/0022 |
| | | | 455/435.1 |
| 2015/0334622 A1* | 11/2015 | Baboescu | H04W 36/14 |
| | | | 370/331 |

* cited by examiner

APPARATUS, SYSTEMS AND METHODS FOR IMPROVED MOBILITY BETWEEN NETWORKS

BACKGROUND

Wireless communication systems are rapidly growing in usage. Further, wireless communication technology has evolved from voice-only communications to also include the transmission of data, such as Internet and multimedia content. A user equipment ("UE") may be configured to establish a connection with different types of networks through the use of wireless communications protocols. Accordingly, based upon the capabilities of the hardware and software of the UE, the connection may be made with these different types of networks. For instance, the network may be a Universal Mobile Telecommunication System ("UMTS") or Long Term Evolution ("LTE") network for data connectivity, or the network may be a Global System for Mobile Communications ("GSM") or Code Division Multiple Access ("CDMA") network for voice connectivity. Furthermore, each of these networks may utilize different radio access standards, such as evolved UMTS Terrestrial Radio Access Network ("EUTRAN"), Universal Terrestrial Radio Access Network ("UTRAN"), and GSM EDGE Radio Access Network ("GERAN").

LTE, commonly referred to a "4G LTE," is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols or 2G/3G networks, such as GSM/UMTS protocols and CDMA 2000 1× (e.g., 1×RTT or simply "1×") wireless communication protocols. In addition, standards are being developed for new 5G networks. Each of these different types of networks and protocols may be termed radio access technologies ("RATs").

A UE may be configured to communicate wirelessly with a cellular network, such as an LTE or UMTS network, by associating with a base station ("BS") of the network. The UE may include a network application that is executed to perform this functionality of joining the network and associating with the BS. Furthermore, the UE may also be configured to communicate with smaller, short-range networks, such as a WiFi networks or personal area networks (e.g., a Bluetooth network). Accordingly, the UE may transition between multiple networks, such as from the LTE/UMTS network to the WiFi/Bluetooth network, during the operation of the UE. However, conventional UEs that cannot keep the simultaneous connection between LTE/UMTS network and the WiFi/Bluetooth network will perform attach and detach procedures for every toggle between LTE/UMTS and WiFi/Bluetooth. The repetition of such processes requires extra power from the UE and may induce delay and increased signaling overhead. Thus, conventional methods for transitioning between a cellular network and a short-range network result in inefficient use of power and signaling by the UE.

SUMMARY

Described herein are apparatus, systems and methods for improved mobility between wireless networks. A method may comprise, at a user equipment ("UE") in communication with a cellular network, activating a detach timer for the cellular network, detecting a short-range network, communicating with the short-range network, storing registration and bearer context data related to the cellular network, interrupting communication with the cellular network, and prior to the expiration of the detach timer, reconnecting to the cellular network via a service request without using an attach procedure.

Also described herein is a user equipment ("UE") device comprising a non-transitory memory having a program stored thereon, and a processor. Furthermore, execution of the program causes the processor to perform operations comprising activating a detach timer for the cellular network, detecting a short-range network while in communication with a cellular network, communicating with the short-range network, storing registration and bearer context data related to the cellular network, interrupting communication with the cellular network, and prior to the expiration of the detach timer, reconnecting to the cellular network via a service request without using an attach procedure.

Also described herein is an integrated circuit in communication with a non-volatile computer-readable medium that stores instructions that, when executed by the integrated circuit, cause the integrated circuit to perform operations including activating a detach timer for the cellular network, detecting a short-range network, communicating with the short-range network, storing registration and bearer context data related to the cellular network, interrupting communication with the cellular network while maintaining the detach timer, and prior to the expiration of the detach timer, reconnecting to the cellular network via a service request without using an attach procedure.

DETAILED DESCRIPTION

The exemplary embodiments may be further understood with reference to the following description and the appended drawings, wherein like elements are referred to with the same reference numerals. The exemplary embodiments describe apparatus, systems and methods for improved mobility between multiple networks, such as a cellular network (e.g., an LTE network) and a short-range network (e.g., WiFi or Bluetooth networks) for a mobile device, such as a user equipment ("UE") associated with an LTE network. In the exemplary embodiments, the mobile device will be described as a UE associated with cellular networks, such as LTE, and one or more short-range personal area networks, such as WiFi and/or Bluetooth. However, it will be understood by those skilled in the art that UEs operating in accordance with other network standards may also implement the exemplary embodiments in accordance with the functionalities and principles described herein. This also includes further evolutions of networking standards (e.g., 5G cellular network).

Those skilled in the art will understand that the current methodology for transitioning a conventional UE, which cannot maintain simultaneous connectivity, between a cellular network and a short-range network requires the UE to perform a detachment procedure and an attach procedure for every instance of the exchange. In other words, a UE that is attached to an LTE network will detach from the LTE network when an accessible short-range network is detected. If that UE is to return to the LTE network, the conventional UE would need to reestablish a connection with the LTE network by performing an attach procedure.

One skilled in the art would understand that a network attach procedure may refer to a registration operation performed by the UE to register with a network and receive service. Within an LTE network, the attach procedure is combined with a packet data network ("PDN") or internet protocol ("IP") connectivity. The attach procedure may then trigger one or more dedicated bearer establishment procedures to designate a dedicated evolved packet system ("EPS") bearer for that UE. Furthermore, the UE may also make a request for an IP address allocation during the LTE attach procedure. Again, other types of networks may include different or additional steps during an attach procedure.

Accordingly, each of the steps performed during a conventional attach procedure increases the signaling overhead and power consumption by the UE and may also induce delays in the transmission of data. Such attach procedures may lead to changes in the IP address for every exchange, or toggle, between networks. Furthermore, any changes in an IP address for the UE may require applications operating on the UE to trigger excess signaling to their servers (e.g., Transport Layer Security ("TLS") handshakes, request to maintain a communication link or "keepalive" messages, etc.).

As will be described in greater detail below, the exemplary systems and methods may allow for the UE to limit the need to perform attach procedures with the network. For instance, link budget limited devices, such as wearable communication devices, may have a lower transmit power due to hardware and/or software limitations (e.g., antenna size, processing capacity, battery size, etc.). Accordingly, any excess signaling related to attach procedures and/or IP address changes may result in degradation of performance by these link budget limited devices.

According to the exemplary embodiments described herein, the attach and detach procedures of the UE may be avoided by maintaining a detach timer while the UE transitions between a cellular network and a short-range network. For instance, a UE on a cellular network may utilize an implicit detach timer such as a periodic tracking area update ("TAU") timer or a routing area update ("RAU") timer. While one or more of these detach timers may reside locally on the UE, it is noted that there may be a corresponding network-side timer maintained and monitored by the cellular network. Throughout this description, it will be described that the UE may use a timer to perform various functionalities. This functionality may be described as being implemented in a timer or a detach timer. The timer that is used by the UE to perform these functionalities may be the TAU timer or the RAU timer. However, in addition, the UE may also implement a separate timer to perform the functionalities described herein.

One skilled in the art would understand that periodic tracking area updating is used to periodically notify the availability of the UE to the network, wherein the initiation of the procedure may be controlled in the UE by the periodic TAU timer (e.g., timer T3412). The value of the timer may be sent by the network to the UE in an ATTACH ACCEPT message and/or a TRACKING AREA UPDATE ACCEPT message, and the UE may apply this value in all tracking areas assigned to the UE until a new value is received. Likewise, the periodic RAU Timer (e.g., timer T3312) may be used to send RAU message periodically, wherein the value of RAU timer is set based on the value received in the ATTACH ACCEPT and/or ROUTING AREA UPDATE ACCEPT message.

The detach timers may be used to locally detach the UE from the cellular network if the UE is not reachable by the network throughout the duration the detach timer (e.g., the UE does not respond to any of the incoming page messages). Typically, the periodic TAU or RAU timers have a value set on the order of 54 minutes. However, other values may be used. These timers may be started (or restarted) whenever the UE transitions from a connected mode to an idle mode.

According to the exemplary embodiments described herein, an exemplary UE may maintain the timers when the UE transitions out of a cellular network (e.g., LTE) to another network (e.g., WiFi or Bluetooth). In other words, instead of performing a detach procedure with the LTE network, the UE may save the registration and bearer context data while keeping the detach timers active. For instance, if the UE detects the presence of a WiFi network, the UE may save the registration/bearer context data for the cellular network and may power down the cellular modem. While the detach timers are still active, the UE may return to the cellular network without ever detaching from the network. Since the UE did not perform any detach procedures and the detach timers are still active, an attach procedure would not be necessary. Accordingly, the UE may directly start transmitting data with a service request upon reconnecting with the cellular network.

It should be noted that this process may be based on the fact that the timers are an implicit indication of whether the cellular network has maintained the context for the UE. As described above, the exemplary TAU and RAU timers may have a value of 54 minutes that is set by the cellular network. The cellular network may delete the context of the UE or detach the UE after the expiration of the exemplary timers plus some buffer time, e.g., an additional 4 minutes. If the UE is to return to the cellular network prior to the expiration of the timers, the UE may be reasonably sure that the cellular network has not detached the UE because this should occur after the expiration of the timer(s). Thus, if the UE has saved the context of the previous connection and is attempting to return to the cellular network prior to the expiration of the timer(s), the UE may continue to communicate with the cellular network using this context.

Figure 1:
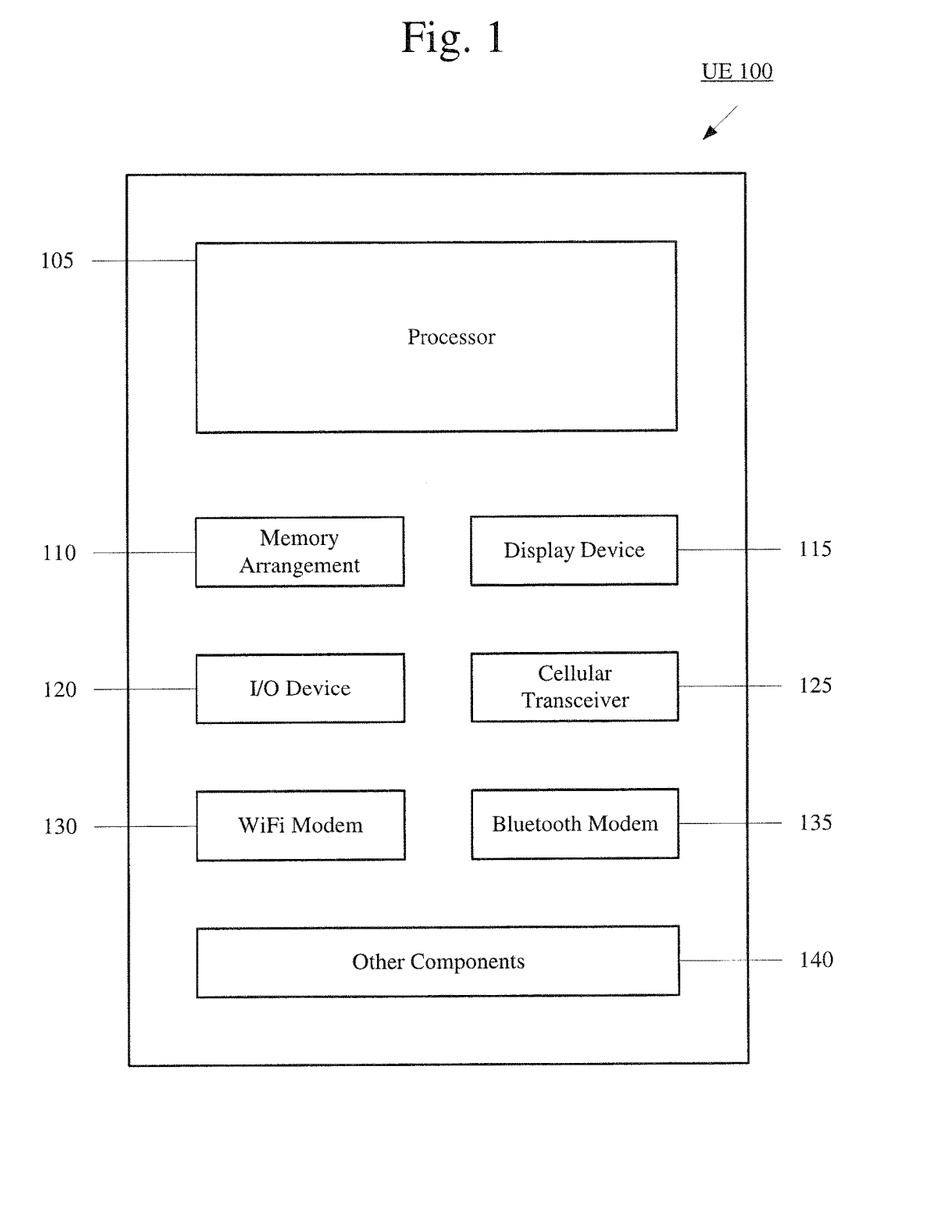
FIG. 1 shows an exemplary UE for improved mobility between multiple networks according to various embodiments described herein.

FIG. 1 shows an exemplary UE 100 for improved mobility between multiple networks according to various embodiments described herein. The UE 100 may represent any electronic device that is configured to perform wireless functionalities. For example, the UE 100 may be a portable device such as wearable communication device (e.g., a smartwatch), a phone, a smartphone, a tablet, a phablet, a laptop, etc. In another example, the UE 100 may be a stationary device such as a desktop terminal. Regardless of the type or configuration of the device, the UE 100 may be configured to perform wireless communications, such as cellular (e.g., LTE) and short-range (e.g., WiFi and/or Bluetooth) functionalities.

The UE 100 may include a processor 105, a memory arrangement 110, a display device 115, an input/output (I/O) device 120, a cellular transceiver 125, a WiFi modem 130, a Bluetooth modem 135 and other components 140. It should be noted that in some instances the WiFi modem 130 and the Bluetooth modem 135 are implemented on the same integrated circuit chip. The other components 140 may include, for example, an audio input device, an audio output device, a battery, a data acquisition device, ports to electrically connect the UE 100 to other electronic devices, etc. The other components 140 may also include the herein described timers. Although, it is also possible that a different component implements the functionality of the timers described herein, e.g., the processor 105. The processor 105 may be configured to execute a plurality of applications of the UE 100.

It should be noted that the application described herein as being applications (e.g., programs) executed by the processor 105 is only exemplary. The functionality associated with the applications may also be represented as a separate incorporated component of the UE 100 or may be a modular component coupled to the UE 100, e.g., an integrated circuit with or without firmware. In addition, in some UEs, the functionality described for the processor 105 is split among two processors, a baseband processor and an application processor ("AP"). The exemplary embodiments may be implemented in any of these or other configurations of a UE.

The memory 110 may be a hardware component configured to store data related to operations performed by the UE 100. Specifically, the memory 110 may store data related to various applications. The display device 115 may be a hardware component configured to show data to a user while the I/O device 120 may be a hardware component that enables the user to enter inputs. It should be noted that the display device 115 and the I/O device 120 may be separate components or integrated together such as a touchscreen.

The UE 100 may be configured to communicate directly with multiple networks, such as an LTE network or a legacy radio access network ("RAN") and a short-range network. One skilled in the art will understand that exemplary legacy RANs may include a circuit switched network, e.g., GSM, UMTS, CDMA, 1xRTT, 1x, etc. With regards to the exemplary embodiments, the UE 100 may establish a connection with the LTE RAN to, among other functionalities, perform data transfers, voice calls and exchange SMS messages with the LTE network. Furthermore, the UE 100 may transition from the LTE RAN to a short-range network, such as Bluetooth or WiFi, and continue to perform such functionalities.

The cellular transceiver 125 may be a hardware component configured to transmit and/or receive data. That is, the cellular transceiver 125 may enable communication with other electronic devices directly or indirectly through one or more networks based upon an operating frequency of the network. The cellular transceiver 125 may operate on a variety of different frequencies or channels (e.g., set of consecutive frequencies). Thus, one or more antennas (not shown) coupled with the cellular transceiver 125 may enable the cellular transceiver 125 to operate on the cellular network (e.g., LTE frequency band). The WiFi modem 130 and Bluetooth modem 135 enable the UE 100 to operate and exchange data via WiFi and Bluetooth networks, respectively.

Figure 2:
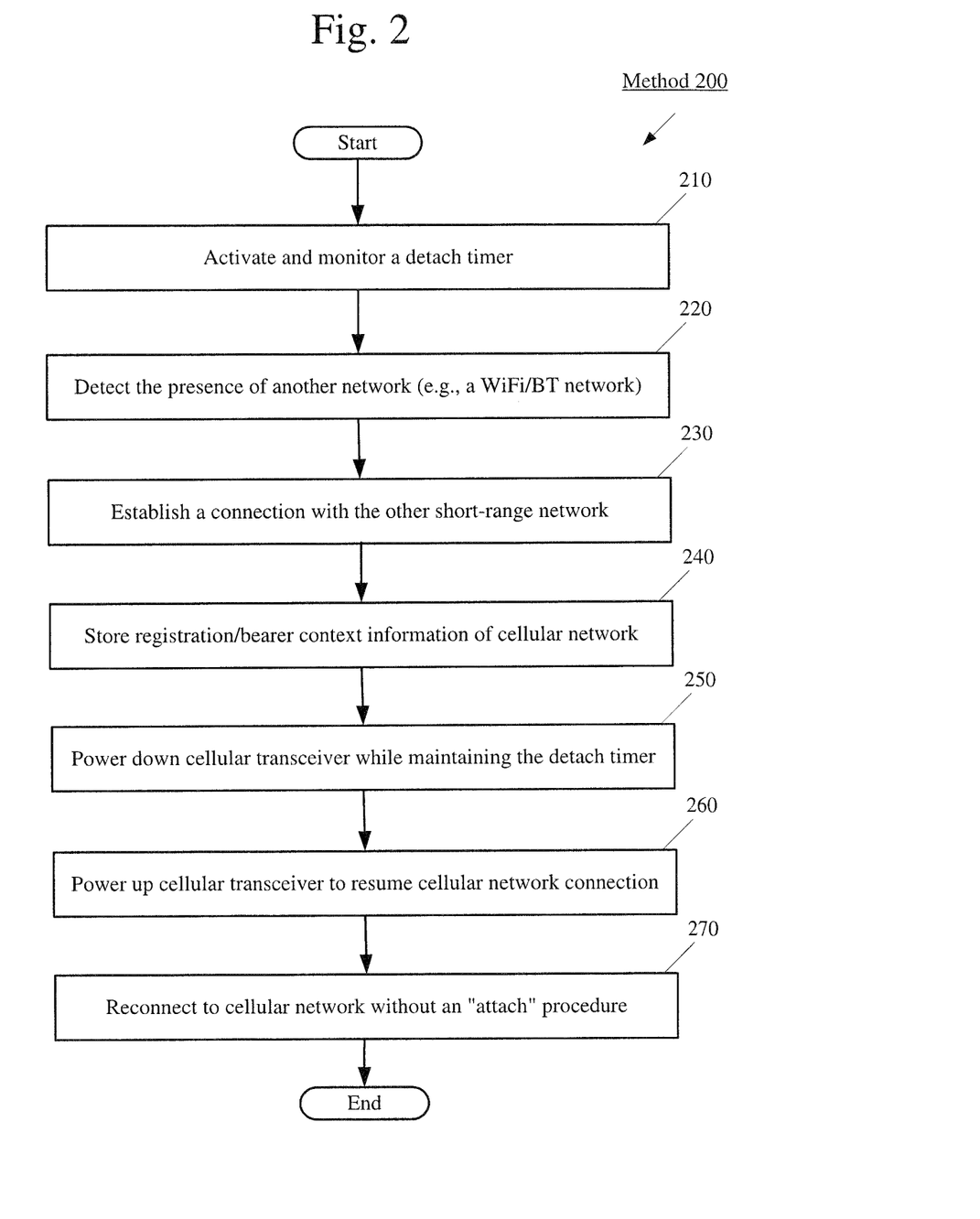
FIG. 2 shows an exemplary method for improved mobility between multiple networks according to various embodiments described herein.

FIG. 2 shows an exemplary method 200 for improved mobility between multiple networks, such as a cellular network and a short-range network, according to various embodiments described herein. It should be noted that while the exemplary method 200 is described as being performed by the processor 105, any combination of hardware and software components of the UE 100, such as, but not limited to a baseband processor, an AP, the cellular transceiver 125, etc., may be capable performing the methods described herein.

Initially, the exemplary UE 100 may be in communication with a cellular network, such as an LTE RAN. While the UE 100 is communicating with the cellular network, in 210 the processor 105 may activate and monitor a detach timer for the cellular network. As discussed above, the detach timer (e.g., T3412 for TAU, T3312 for RAU) may be utilized to locally detach from the cellular network when the UE 100 is unavailable to the cellular network for a predetermined period of time. Furthermore, the timer may be activated when the UE 100 moves from a connected mode to an idle mode. For example, when the UE 100 is in the connected mode, the UE 100 is currently communicating with the cellular network, thus the UE 100 is available to the cellular network and therefore, there is no reason to determine if the UE 100 is unavailable. The timer is activated when the UE 100 enters idle mode because in this mode, the UE 100 is not currently communicating with the cellular network so the cellular network will periodically determine if the UE 100 is still available.

In 220, the UE 100 may detect the presence of a short-range network, such as a WiFi network or a Bluetooth network. Due to any number of factors, such as but not limited to reliability, link budget constraints, cellular usage, etc., it may be desirable for the UE 100 to transition from the cellular communication network to the short-range network.

In 230, the UE 100 may establish communications with the short-range network. For instance, the WiFi modem 130 of the UE 100 may pair with the WiFi network and/or the Bluetooth modem 135 of the UE 100 may pair with the Bluetooth network.

In 240, the UE 100 may store registration and bearer context data related to the cellular network (e.g., in memory arrangement 110). In other words, as opposed to detaching from the cellular network link once the connection is established to the short-range network, the exemplary UE 100 may record any information related to the cellular network link (e.g., the current cellular context) in the memory arrangement 110.

In 250, the processor 105 may power down the cellular transceiver 125 of the UE 100 to interrupt communication over the cellular network while maintaining the detach timer activated in 210. According to one additional embodiment, the UE 100 may initiate a Radio Resource Control ("RRC") protocol connection with the cellular network prior to powering down. By initiating an RRC connection the exemplary timer(s) may be restarted. In this manner, the UE 100 may be granted the full duration of the detach timers while the link between the UE 100 and the cellular network is interrupted. Thus, this may prolong the time period before which the UE 100 may need to perform an attach procedure. To provide a specific example, it may be considered that the detach timer has a period of 54 minutes and the UE 100 may have entered idle mode twenty minutes prior to the execution of the method 200. By initiating the RRC connection prior to powering down the cellular transceiver 125, the detach timer may be reinitiated to the full 54 minutes rather than the current (54 minutes–20 minutes=34 minutes).

It is noted that powering down the cellular transceiver 125 of the UE 100 in 250 is merely an example of discontinuing communication with the cellular network. Additional example for losing connection with the cellular network may include, for instance, from the UE 100 moving away out of the cellular network range. Accordingly, the exemplary method 200 may allow for the UE 100 to retain the context information and maintain the timer without powering down the UE 100 or the cellular transceiver, but also when the UE 100 is away from the cellular network.

In 260, the processor 105 may power up the cellular transceiver 125 to resume communication over the cellular network. For instance, the cellular network may be back within the range of the UE 100, or, alternatively, the short-range network may no longer be available to the UE 100. Thus, based on a change in circumstances, the UE 100 may desire to transition from the short-range network back to the original cellular network.

Furthermore, the processor 105 may determine whether the detach timer had expired. As noted above, the duration of the detach timer may be set to a predetermined value, such as 54 minutes. When the UE 100 is returning to the cellular network, the UE may determine whether the detach timer has expired. If the detach timer has expired, the UE 100 may perform an attach procedure to reconnect with the cellular network. As described above, this full attach procedure may be performed because the UE 100 may not be sure that the stored cellular context is still active because the cellular network may have detached the UE 100 based on the inactivity.

However, if the detach timer is still active, in 270, the UE 100 may reconnect to the cellular network to resume communication with the cellular network without performing the attach procedure. For instance, the UE 100 may directly start transmitting and receiving data over the cellular network via a service request using the stored context information. Again, since the detach timer has not expired, the UE 100 is reasonably sure that the stored cellular context is still active.

According to a further additional embodiment, the exemplary method 200 may also allow for the UE 100 to send a request to the network to extend the duration of the detach timer(s). Specifically, certain timers, such as the TAU T3412 timer, permit the UE 100 to request an extended timer in either the ATTACH REQUEST message or the TRACKING AREA UPDATE REQUEST message. If the network honors this request, the UE 100 may be provided with a larger value for the duration of the detach timer in the ATTACH REQUEST message or the TRACKING AREA UPDATE REQUEST message. Thus, the UE 100 may extend the period of time in which the UE 100 is out of cellular coverage and return without a need to perform an attach procedure.

Figure 3:
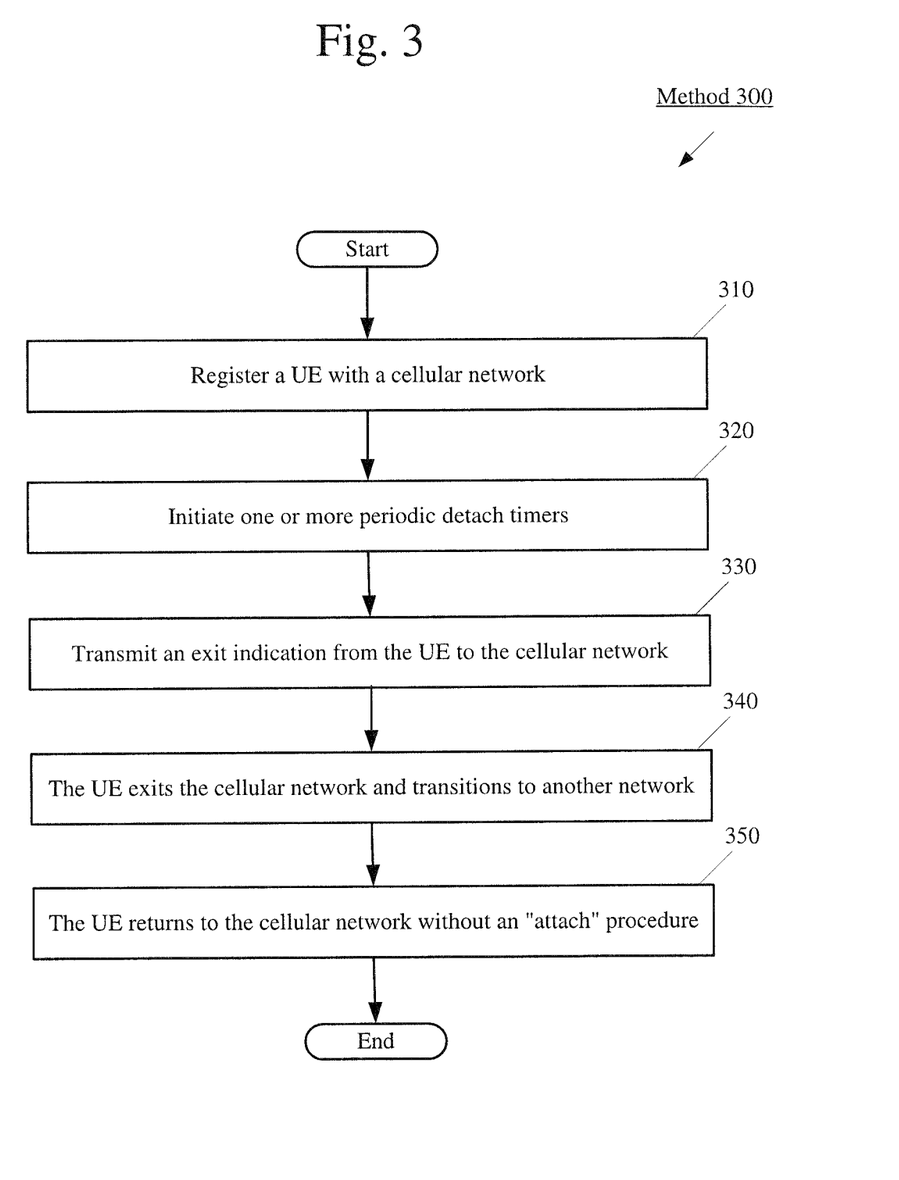
FIG. 3 shows a further exemplary method for improved mobility between multiple networks using a cellular exit indication according to various embodiments described herein.
Figure 4:
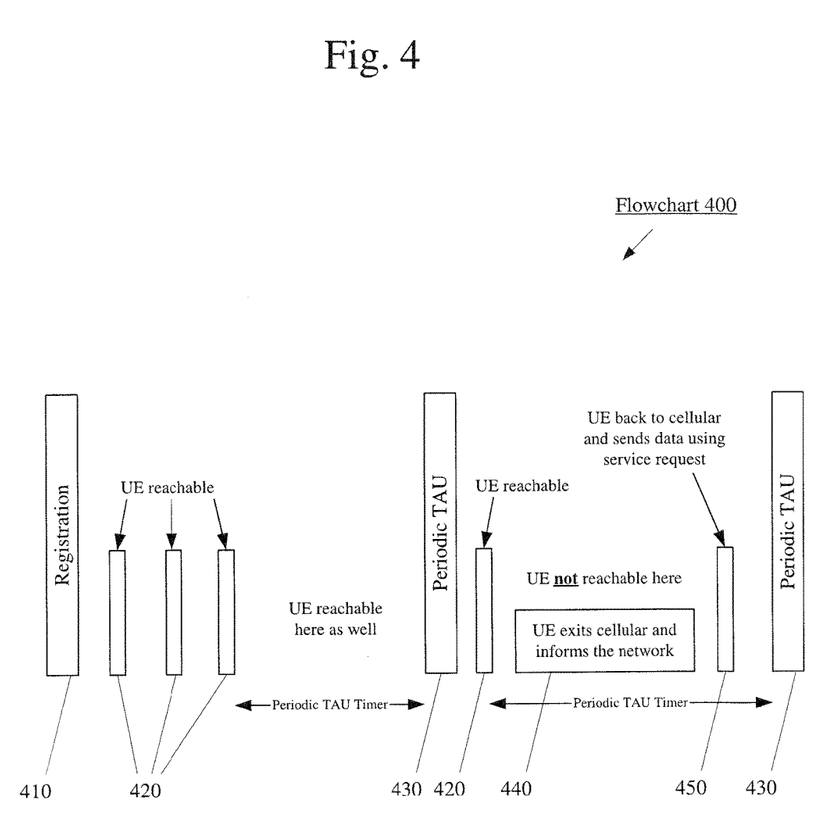
FIG. 4 shows a flowchart depicting improved mobility between multiple networks using a cellular exit indication according to various embodiments described herein.

FIG. 3 shows a further exemplary method 300 for improved mobility between multiple networks, such as a cellular network and a short-range network, using a cellular exit indication according to various embodiments described herein. More specifically, the exemplary method 300 may allow the UE 100 to inform the cellular network when the UE 100 wishes to exit the cellular network but still maintain its context data. Similar to method 200, the exemplary method 300 is described as being performed by the processor 105, however any combination of hardware and software components of the UE 100, such as, but not limited to a baseband processor, an AP, the cellular transceiver 125, etc., may be capable performing the methods described herein. Furthermore, FIG. 4 shows a flowchart 400 depicting the method 300 for improved mobility between multiple networks using a cellular exit indication.

In 310, the processor 105 may register with the cellular network. This is shown as registration 410 in FIG. 4. For instance, the UE 100 may establish an initial connection with the cellular network due to the UE 100 powering up. Alternatively, the UE 100 may reestablish a new connection with the cellular network due to the expiration of a periodic update timer, such as the T3412 timer for TAU and/or the T3312 timer for RAU, or a transition from a connected mode to an idle mode. This is shown as the periodic TAU 430 in FIG. 4.

In 320, after registering with the cellular network, the timer(s), such as the periodic TAU timer, may be initiated. At first, the exemplary UE 100 may remain reachable by the network throughout the duration of the timer. This is shown as the UE 100 being reachable 420 in FIG. 4. However, at some point the UE 100 may wish to transition to another network, such as a short-range network.

In 330, the processor 105 may transmit an exit indication to inform the cellular network that the UE 100 will exit the cellular network. According to the exemplary method 300, a cellular exit indication signal may be transmitted to the network. With this cellular exit indication signal, the UE 100 may inform the cellular network when the UE 100 is moving to WiFi or Bluetooth. It is noted that the UE 100 may be reachable to the cellular network in the downlink before the exit signal is transmitted to the network.

In 340, the UE 100 may then exit the cellular network and transition to another network, such as the short-range WiFi and/or Bluetooth networks. During this period, the periodic timers may remain active, however the UE may not be reachable by the network. This is shown as the UE 100 not being reachable 440 in FIG. 4.

In 350, the UE 100 may return to the cellular network using a service request prior to the expiration of the timer. Thus, by using the cellular exit indication signal, there is no need for any additional signaling between the UE 100 and the network when the UE 100 returns to the cellular network prior to the expiration of the periodic TAU/RAU timers. This is shown as the return to the cellular network 450 in FIG. 4. Accordingly, the exemplary method 300 described herein allow for the UE 100 and the network to avoid any signaling related to a DETACH procedure before exiting cellular and an ATTACH procedure before entering the cellular.

According to one embodiment, the periodic timer after exit indication may be set to infinite or the possible largest values. In other words, the UE 100 may exit the cellular network and return back before any duration and with no additional signaling while the network maintains the context all this while. In an another embodiment, the exit and entry signals may be a TAU message having new IEs/timer values added or having reused existing values, such as T3412 and T3324 timers. Any combinations of the timer values (e.g., the T3412 timer with infinite value, etc.) may be requested by UE to network and communicated back to the UE 100 by the network.

It may be noted that the exemplary embodiments are described with reference to the LTE and/or LTE-Advanced communication system and WiFi and/or Bluetooth short-range networks. However, those skilled in the art will understand that the exemplary embodiments may be applied to improved transitioning between networks within any wireless communication schemes including those having different characteristics from the LTE, WiFi and Bluetooth schemes.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
    at a user equipment ("UE") in communication with a cellular network:
        activating a detach timer for the cellular network, wherein the detach timer indicates a time until the UE detaches from the cellular network;
        communicating with a short-range network;
        storing registration and bearer context data related to the cellular network;
        while in communication with the short-range network, discontinuing communication with the cellular network;
        prior to discontinuing communication with the cellular network and in response to communicating with the short-range network, initiating, by the UE, a Radio Resource Control ("RRC") protocol connection with the cellular network, wherein the RRC protocol connection causes the detach timer to reset to an initial value; and
        prior to the expiration of the detach timer, reconnecting to the cellular network via a service request using the stored registration and bearer context data without using an attach procedure.

2. The method of claim 1, further comprising:
    transmitting, by the UE, a timer extension request to the cellular network to extend a duration of the detach timer; and
    receiving, by the UE, a new timer value from the cellular network to extend the duration of the detach timer.

3. The method of claim 1, further comprising:
    transmitting, by the UE, an exit indication to the cellular network informing the cellular network that the UE will transition to the short-range network.

4. The method of claim 1, wherein the discontinuing the communication with the cellular network includes powering down a cellular transceiver of the UE and reconnecting to the cellular network includes powering up the cellular transceiver.

5. The method of claim 1, wherein the discontinuing the communication with the cellular network includes exiting a range of a cellular transceiver and reconnecting to the cellular network includes returning within the range of the cellular transceiver.

6. The method of claim 1, wherein the short-range network is one of a WiFi network and a Bluetooth network.

7. The method of claim 1, wherein the detach timer is one of a periodic tracking area update ("TAU") timer and a periodic routing area update ("RAU") timer.

8. The method of claim 1, wherein the time until the UE detaches from the cellular network comprises a time until the UE performs a detach procedure to detach from the cellular network.

9. A user equipment ("UE") device, comprising:
    a memory arrangement;
    a cellular transceiver configured to communicate with a cellular network;
    a non-cellular transceiver configured to communicate with a short-range network;
    a detach timer; and
    a processor that activates the detach timer for the cellular network and stores registration and bearer context data related to the cellular network when the UE discontinues communication with the cellular network and connects to the short-range network,
        wherein, prior to discontinuing communication with the cellular network and in response to communicating with the short-range network, the processor initiates a Radio Resource Control ("RRC") protocol connection with the cellular network, wherein the RRC protocol connection causes the detach timer to reset to an initial value;
        wherein the detach timer indicates a time until the UE detaches from the cellular network; and
        wherein prior to the expiration of the detach timer, the cellular transceiver reconnects to the cellular network via a service request using the stored registration and bearer context data without using an attach procedure.

10. The UE device of claim 9, wherein the cellular transceiver transmits a timer extension request to the cellular network to extend a duration of the detach timer and receives a new timer value from the cellular network, wherein the processor extends the duration of the detach timer based on the new timer value.

11. The UE device of claim 9, wherein the cellular transceiver transmits an exit indication to the cellular network informing the cellular network that the UE will transition to the short-range network.

12. The UE of claim 9, wherein the discontinuing the communication with the cellular network includes one of:
    powering down the cellular transceiver of the UE and reconnecting to the cellular network includes powering up the cellular transceiver, and
    exiting a range of the cellular transceiver and reconnecting to the cellular network includes returning within the range of the cellular transceiver.

13. The UE of claim 9, wherein the non-cellular transceiver is one of a WiFi modem or a Bluetooth modem.

14. An integrated circuit in communication with a non-volatile computer-readable medium that stores instructions that, when executed by the integrated circuit, cause the integrated circuit to perform operations including:
    activating a detach timer for a cellular network, wherein the detach timer indicates a time until a UE detaches from a cellular network;
    communicating with a short-range network;
    storing registration and bearer context data related to the cellular network;
    while in communication with the short-range network, discontinuing communication with the cellular network;
    prior to discontinuing communication with the cellular network and in response to communicating with the short-range network, initiating, by the UE, a Radio Resource Control ("RRC") protocol connection with the cellular network, wherein the RRC protocol connection causes the detach timer to reset to an initial value; and
    prior to the expiration of the detach timer, reconnecting to the cellular network via a service request using the stored registration and bearer context data without using an attach procedure.

15. The integrated circuit of claim 14, wherein the integrated circuit further performs operations comprising:
    transmitting a timer extension request to the cellular network to extend a duration of the detach timer; and receiving a new timer value from the cellular network to extend the duration of the detach timer.

16. The integrated circuit of claim 14, wherein the integrated circuit further performs operations comprising:
transmitting an exit indication to the cellular network informing the cellular network that the UE will transition to the short-range network while registration and bearer context data related to the cellular network.

17. The integrated circuit of claim 14, wherein the discontinuing the communication with the cellular network includes one of:
powering down a cellular transceiver of the UE and reconnecting to the cellular network includes powering up the cellular transceiver, and
exiting a range of the cellular transceiver and reconnecting to the cellular network includes returning within the range of the cellular transceiver.

18. The integrated circuit of claim 14, wherein the short-range network is one of a WiFi network and a Bluetooth network.

* * * * *